(12) United States Patent
Pardoen et al.

(10) Patent No.: US 6,628,489 B1
(45) Date of Patent: Sep. 30, 2003

(54) BATTERY AND CURRENT REVERSAL PROTECT CIRCUIT

(75) Inventors: Matthijs D. Pardoen, Sunnyvale, CA (US); Wayne T. Holcombe, Mountain View, CA (US)

(73) Assignee: Integration Associates Inc., Mountain View, CA (US)

( * ) Notice: Subject to any disclaimer, the term of this patent is extended or adjusted under 35 U.S.C. 154(b) by 51 days.

(21) Appl. No.: 09/871,435

(22) Filed: May 31, 2001

Related U.S. Application Data

(60) Provisional application No. 60/208,176, filed on May 31, 2000.

(51) Int. Cl.$^7$ ............................................. H02M 3/42
(52) U.S. Cl. ....................................................... 361/84
(58) Field of Search ............................ 361/84, 88, 100, 361/58

(56) References Cited

U.S. PATENT DOCUMENTS

| | | | |
|---|---|---|---|
| 4,857,985 A | | 8/1989 | Miller .......................... 357/42 |
| 5,367,249 A | * | 11/1994 | Honnigford .................. 323/313 |
| 5,381,061 A | * | 1/1995 | Davis ........................... 326/57 |
| 5,410,441 A | * | 4/1995 | Allman ......................... 361/18 |
| 5,517,379 A | * | 5/1996 | Williams et al. .............. 361/84 |
| 5,519,557 A | | 5/1996 | Kopera, Jr. et al. ........... 361/84 |
| 5,764,465 A | | 6/1998 | Mattes et al. ................. 361/77 |
| 5,781,390 A | * | 7/1998 | Notaro et al. ................. 361/84 |
| 6,239,515 B1 | * | 5/2001 | Mackel et al. ............... 307/127 |

* cited by examiner

*Primary Examiner*—Gregory J. Toatley, Jr.
*Assistant Examiner*—Zeev Kitov
(74) *Attorney, Agent, or Firm*—Vernon W. Francissen; Gardner Carton & Douglas LLC

(57) ABSTRACT

A circuit and method are shown for battery reversal protection. The circuit includes a first transistor that buffers a bulk terminal of a protected transistor from an input terminal for receiving a power supply voltage. A second transistor is coupled to both the input terminal of the circuit and an output terminal of the circuit and detects when the power supply voltage falls below an output voltage at the output terminal and, responsive thereto, switches off the first transistor to isolate the bulk terminal of the protected transistor from the input terminal. Another aspect of the invention provides current reversal protection using a third transistor that also detects when the power supply voltage falls below an output voltage at the output terminal and, responsive thereto, conducts current from the output terminal to the gate terminal of the protected transistor. In yet another aspect of the invention, a bulk of the third transistor is coupled to a low current circuit to provide current to the low current circuit from the output terminal when power at the input terminal is interrupted. Because of low current demands on the transistors of the protection circuit, small area transistors may be used to implement the protection circuit using reduced die area.

5 Claims, 3 Drawing Sheets

BATTERY AND CURRENT REVERSAL PROTECT CIRCUIT

This application claims the benefit of provisional application Ser. No. 60/208,176 filed May 31, 2000.

FIELD OF THE INVENTION

This present invention relates to circuitry for protecting a circuit from destructive currents under reverse battery conditions.

BACKGROUND OF THE INVENTION

Battery protection circuitry is typically provided to protect semiconductor circuits and systems from the damage that may occur when a battery is accidentally reversed or disconnected.

Integrated circuits (ICs) will typically be damaged when subjected to voltage and current having a polarity that is opposite to that for which they were designed. In order to protect ICs from reversed battery, a diode is commonly placed between the IC a the power supply terminals for the circuit. When a battery voltage having the correct polarity is coupled to the power supply terminals, then the protection diode is forward biased and allows the IC to receive the battery voltage and current. However, if the battery voltage is reversed, then the diode is reverse biased and the harmful voltage and current is prevented from reaching the IC. Also, the voltage drop introduced by the protection diode represents lost power and a reduced range of operating voltage because the input power supply must account for the threshold voltage drop.

SUMMARY OF THE INVENTION

The circuit and method of the present invention includes a battery protection circuit. The circuit and method of the present invention buffers a protected circuit from an input terminal that receives a power supply voltage.

An embodiment of a battery reversal protection circuit, according to the present invention, includes first and second input terminals for receiving a power supply voltage and an output terminal. A first transistor of the protection circuit has a control terminal and first and second current terminals, where the first current terminal of the first transistor is coupled to the first input terminal. A resistor is coupled between the control terminal of the first transistor and the second input terminal. A second transistor of the protection circuit has a control terminal and first and second current terminals. The control terminal of the second transistor is coupled to the first input terminal, the first current terminal of the second transistor is coupled to the output terminal, and the second current terminal of the second transistor is coupled to the control terminal of the first transistor. Further, a third transistor of the protection circuit has a control terminal, a bulk terminal, and first and second current terminals, where the third transistor is at least part of a protected circuit, the first current terminal of the third transistor being coupled to the first input terminal, the second current terminal of the third transistor being coupled to the output terminal, and the bulk terminal of the third transistor being coupled to the second current terminal of the first transistor.

An embodiment of a method, according to the present invention, for providing battery protection to a protected transistor, includes disposing the protected transistor between a first input terminal and an output terminal and receiving a power supply voltage at the first input terminal and a second input terminal. The method further calls for buffering a bulk terminal of the protected transistor from the first input terminal through a first transistor and driving a control terminal of the first transistor with a second transistor. The method further involves using the second transistor to detect when the power supply voltage at the first input terminal drops below an output voltage at the output terminal by a transistor threshold in order to prevent current flow between the first input terminal and the bulk terminal of the protected transistor. In a further refinement of the embodiment, the method further includes using a third transistor to sense when the supply voltage drops below an output voltage by a transistor threshold and to permit current to flow from the output terminal to a gate terminal of the protected transistor.

An embodiment of a low drop-out voltage regulator circuit with battery reversal protection, according to the present invention, includes first and second input terminals for receiving a power supply voltage and an output terminal for outputting a regulated voltage. The circuit also includes a voltage reference circuit having first and second supply terminals and an output terminal, where the second supply terminal of the voltage reference circuit is coupled to the second input terminal. An error amplifier is provided having first and second supply terminals, first and second input terminals, and an output terminal, where the second supply terminal of the error amplifier is coupled to the second input terminal, the first input terminal of the error amplifier is coupled to the output terminal of the voltage reference circuit, and the second input terminal of the error amplifier is coupled to the output terminal through a resistive divider. The circuit includes a power transistor having a control terminal, a bulk terminal, and first and second current terminals, where the control terminal of the power transistor is coupled to the output terminal of the error amplifier, and the second current terminal of the power transistor is coupled to the output terminal. A first transistor of the circuit has a control terminal and first and second current terminals. The first current terminal of the first transistor is coupled to the first input terminal and the second current terminal of the first transistor is coupled to the first supply terminal of the voltage reference circuit and the first supply terminal of the error amplifier. A resistor is coupled between the control terminal of the first transistor and the second input terminal. A second transistor of the circuit has a control terminal and first and second current terminals. The control terminal of the second transistor is coupled to the output terminal, the first current terminal of the second transistor is coupled to the output terminal, and the second current terminal of the second transistor is coupled to the control terminal of the first transistor. Finally, a third transistor of the circuit has a control terminal and first and second current terminals. The control terminal of the third transistor being coupled to the second current terminal of the second transistor, the first current terminal of the third transistor being coupled to the first input terminal, and the second current terminal of the third transistor being coupled to the bulk terminal of the power transistor.

Finally, a second transistor is provided having a control terminal and first and second current terminals. The control terminal of the second transistor is coupled to the output terminal, the first current terminal of the second transistor is coupled to the output terminal, and the second current terminal of the second transistor is coupled to the control terminal of the first transistor. In a further refinement of this embodiment, the power transistor further includes a bulk terminal and the circuit further includes a third transistor having a control terminal and first and second current terminals, the control terminal of the third transistor being coupled to the second current terminal of the second transistor, the first current terminal of the third transistor being coupled to the first input terminal, and the second current terminal of the third transistor being coupled to the bulk terminal of the power transistor.

The foregoing and other features and advantages of the circuit and method for battery protection will be apparent from the following more particular description of preferred embodiments of the system and method as illustrated in the accompanying drawings in which like reference characters refer to the same parts throughout the different views.

BRIEF DESCRIPTION OF THE DRAWINGS

Illustrative embodiment of the present inventions are described with reference to the following drawings, wherein.

DETAILED DESCRIPTION OF PREFERRED EMBODIMENTS

The present invention is directed to a circuit and method for reverse battery protection having a low drop-out voltage. While the need for reverse battery protection remains, the additional circuitry and operating voltage required for reverse battery protection have become relatively expensive. There are, therefore, three important design goals: (a) increased battery life by reducing operating voltage; (b) high robustness successful consumer products; and (c) lowered system cost through integrating onto one die as much circuitry as possible.

The present invention integrates reverse battery protection circuitry onto the same semiconductor substrate as the circuit it protects in order to reduce reduces system cost. However, the low drop-out (LDO) voltage reverse battery protection circuit and method of the present invention also reduces the voltage drop and current consumption associated with conventional reverse battery protection circuits.

A variety of battery reversal protection circuits currently exist. Examples of conventional battery reversal protection circuits are illustrated in U.S. Pat. Nos. 4,857,985; 5,519,557; and 5,764,465.

Figure 1:
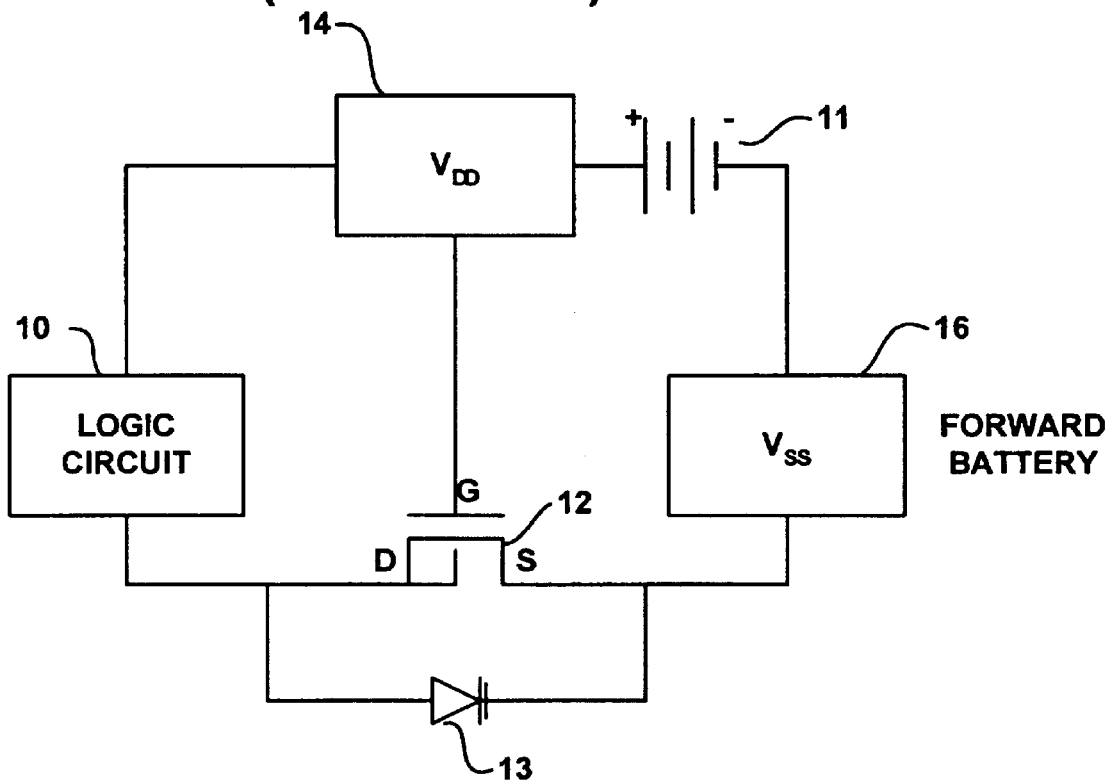
FIG. 1 is a circuit diagram illustrating an example of a conventional reverse battery protect circuit.
Figure 2:
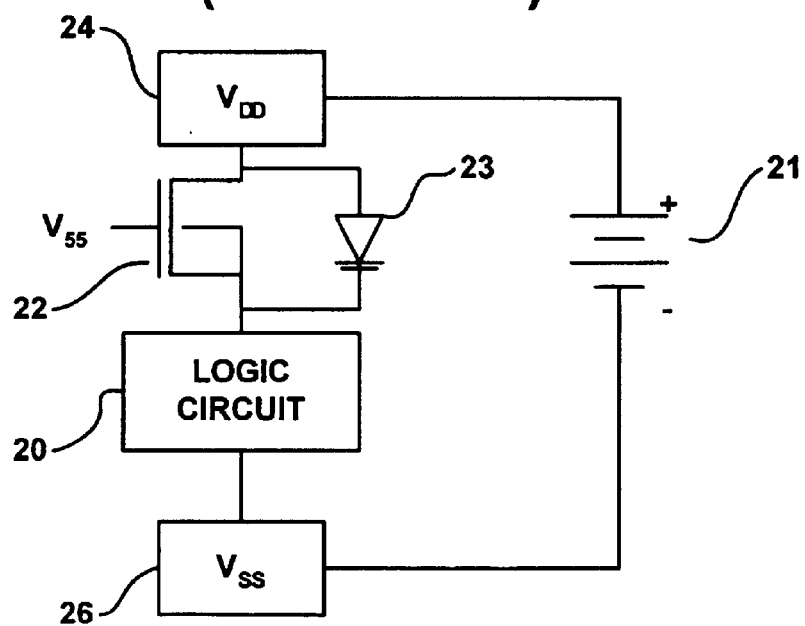
FIG. 2 is a circuit diagram illustrating another example of a conventional reverse battery protect circuit.

FIGS. 1 and 2 are circuit diagrams illustrating the protection circuit approach demonstrated by U.S. Pat. No. 4,857,985. In FIG. 1, a drain-bulk diode 13 protects the circuit 10 when the battery 11 is reversed and the MOS (Metal Oxide Semiconductor) transistor 12 behaves like a switch when the battery 11 is normally connected, thereby avoiding a 0.8 V voltage drop associated with a normal diode.

FIG. 1 illustrates an NMOS (N-channel MOS) implementation of a protect circuit, where transistor 12 is an N-channel device. FIG. 2 illustrates a PMOS (P-channel MOS) implementation of a protect circuit, where transistor 22 is an P-channel device. The choice for using an NMOS transistor or a PMOS transistor depends upon a number of factors: the simultaneous, total maximum output sink current and logic high output voltage $V_{OH}$ required, the simultaneous total maximum output source current and logic low output voltage $V_{OL}$ required, the input voltage level low $V_{IL}$ required, and the input voltage level high $V_{IH}$ relative to supply voltage $V_{DD}$ required. The protective transistor's drain-source voltage $V_{DS}$ will make $V_{OL}$ and $V_{IL}$ more difficult to meet if an N-channel device is selected. $V_{OH}$ and $V_{IH}$ will be more difficult to meet if a P-channel device is selected. In most applications, an N-channel device will be selected because the resulting transistor device size is smaller.

Furthermore, it should be noted that when the NMOS transistor is used for battery protection, the circuit GND is not the same as the Printed Circuit Board GND. This can be very problematic. Most of the time, a very low impedance connection is needed between the circuit GND and the Printed Circuit Board GND (e.g. for amplifier stability). Further note that the total circuit current of the circuits of FIGS. 1 and 2 runs through the MOS transistor. Consequently, if the circuit 10 draws a lot of current in active mode, then the battery protection MOS transistor 12 must be sized accordingly and this can contribute to a large die size for the resulting circuit.

Figure 3:
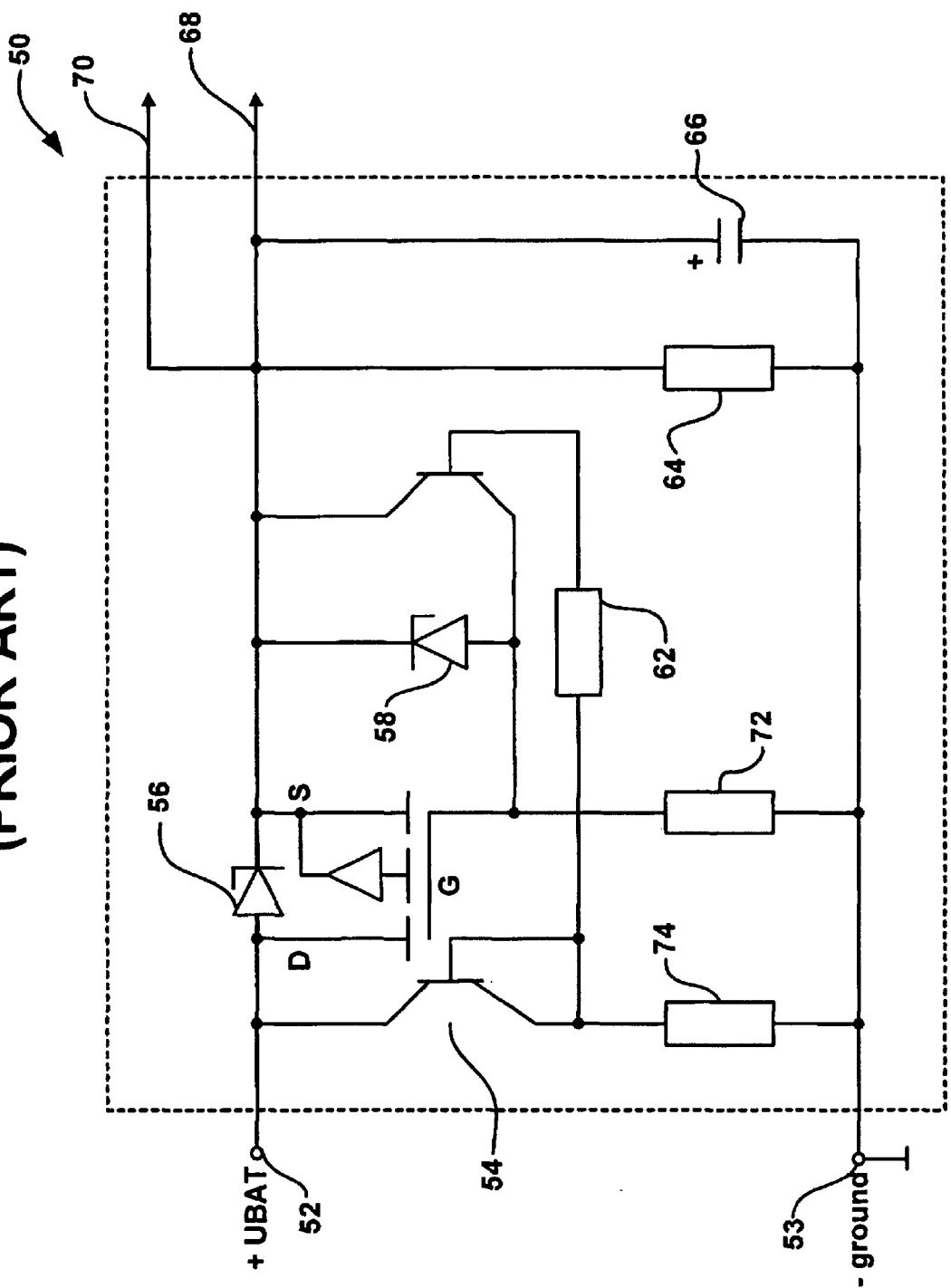
FIG. 3 is a circuit diagram illustrating still another example of a conventional reverse battery protect circuit.

Another disadvantage of the MOS transistor battery protect circuit of FIGS. 1 and 2 is that the protected circuit is not protected against reverse currents, which may occur when capacitors discharge in the event of a sudden battery voltage drop for example (e.g. battery removal). The circuit 50 described in U.S. Pat. No. 5,764,465 and shown in FIG. 3 is configured to address this problem. Circuit 50 is configured such that current to output terminals 68 and 70 is controlled by MOS transistor 56. In the presence of a supply voltage at input terminals 52 and 53, MOS transistor 56 is biased on so as to conduct current from the input to the output terminals. If the battery voltage is suddenly removed from input terminals 52 and 53, then bipolar transistor 60 and resistor 64 will sink the charge on capacitor 66 to ground terminal 53. However, the resulting protect circuit draws current even when the battery protected circuit coupled to output terminals 68 and 70 is in standby mode and draws no current. One can configure circuit 50 to reduce the quiescent current to very low levels, but this may compromise the reaction time of the circuit.

Figure 4:
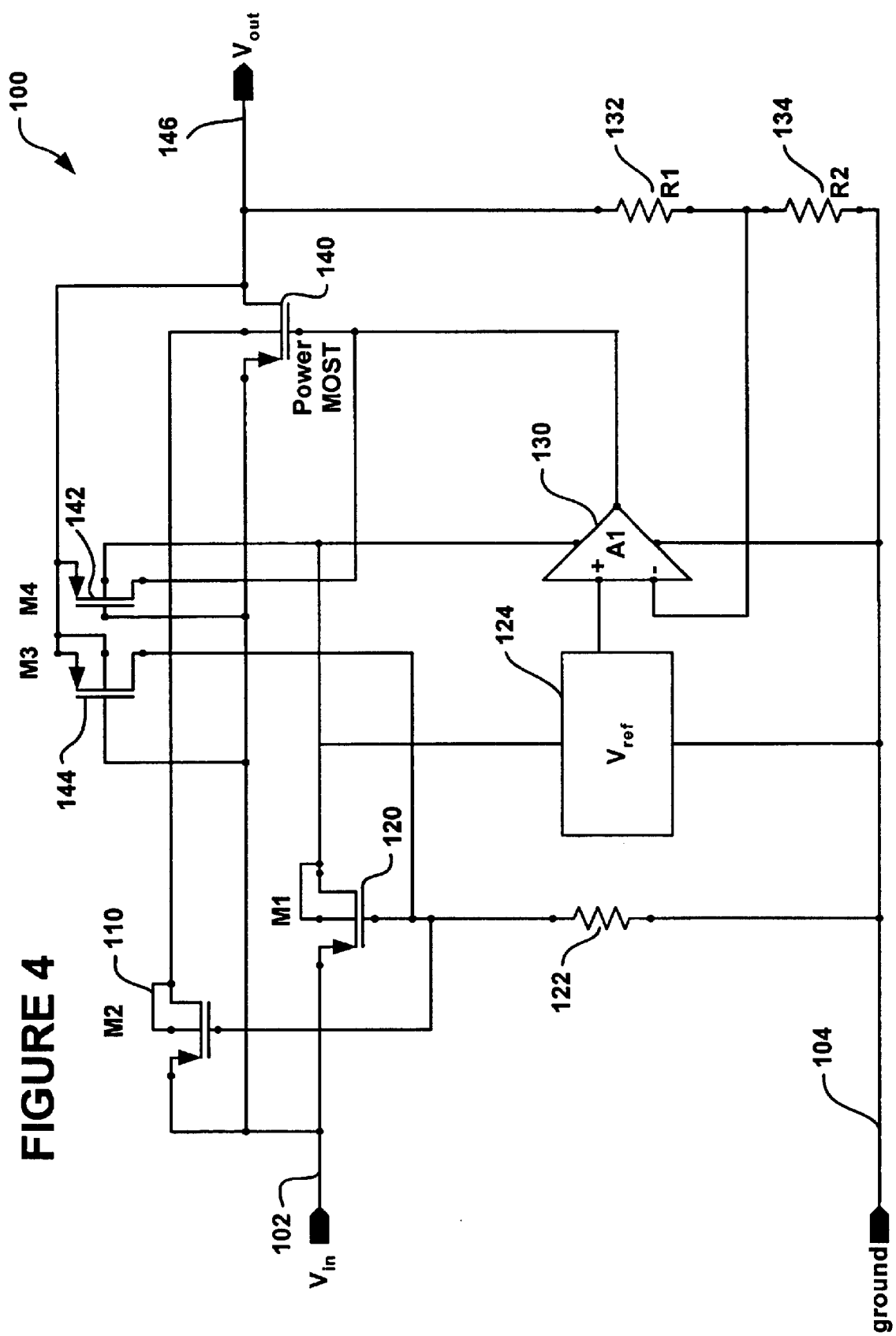
FIG. 4 is a circuit diagram illustrating an embodiment of a low drop-out voltage reverse battery protect circuit according to the present invention.

FIG. 4 is a circuit diagram illustrating an embodiment of a battery reversal protection circuit 100 according to the present invention. In the embodiment of FIG. 4, the protection circuit is shown combined with a low drop-out (LDO) voltage regulator, the regulator consisting of voltage reference 124, error amplifier 130 and power MOS transistor 140, that is being protected.

In circuit 100, a first battery reversal protect mechanism includes PMOS transistors 120 and 144 that protect a low current circuit portion consisting of voltage reference circuit 124 and error amplifier 130. The voltage reference circuit 124 and error amplifier 130 represent circuitry that may be damaged in the event of a battery reversal. PMOS transistor 120 is coupled between input terminal 102, where an external battery voltage is received, and the low current circuit portion, such that PMOS transistor 120, when switched on, permits current to flow from the input terminal 102 to the low current circuit portion. In other words, PMOS transistor 120 allows current to flow from its current terminals, e.g. its source and drain, when switched on by the signal received at its control terminal, e.g. its gate terminal. PMOS transistor 144 is coupled between output terminal 146 and a gate of PMOS transistor 120, e.g. its source is coupled to output terminal 146 and its drain is coupled to the gate of PMOS transistor 120. A gate of PMOS transistor 144 is coupled to input terminal 102.

When a battery reversal or removal occurs at input terminal 102, then the output voltage at output terminal 146 gets one threshold voltage $V_T$ level higher than the input voltage level causing PMOS transistor 144 to conduct. This, in turn, raises the voltage at the gate of transistor 120 causing transistor 120 to turn off. When transistor 120 turns off, then no current flows between the source and drain of transistor 120 and voltage reference 124 and error amplifier 130 are effectively isolated from the input terminal 102.

The embodiment of the present invention shown in FIG. 4 also includes a second battery reversal protect mechanism that includes PMOS transistor 110 that is provided to protect power MOS transistor 140, which may also be viewed as a pass transistor. PMOS transistor 110 protects a bulk-drain and a bulk-source diode of power MOS transistor 140 without conducting significant levels of current. In conventional current protection circuits, a current protection is placed in series with the circuit to be protected, which typically results in the protection circuitry being required to conduct high amounts of current. In the present invention, PMOS transistor 110 is coupled between a bulk connection of power MOS transistor 140 and input terminal 102. The source of PMOS transistor 110 is coupled to input terminal 102 and the source of power MOS transistor 140. The gate of transistor 110 is coupled to the gate of transistor 120 and the drain of transistor 144. Pull-down resistor 122 is coupled between the gate of transistor 110 and the second voltage input terminal 104, e.g. the ground terminal. The source of transistor 144 is coupled to the drain of power MOS transistor 140 and output terminal 146.

As described above, when a battery reversal or removal occurs at input terminal 102, then the output voltage at output terminal 146 gets one threshold voltage $V_T$ level higher than the input voltage level causing PMOS transistor 144 to conduct. This will cause PMOS transistor 110 to switch off effectively isolating the bulk terminal of power MOS transistor 140 from input terminal 102, which will reverse bias the bulk-source diode of transistor 140. Note here that the bulk-source diode of power MOS transistor 140 is protected against forward biasing when battery reversal occurs not by disconnecting the drain or source terminals of the power MOS transistor, but by disconnecting the bulk terminal from the input terminal 102. The amount of current that must be accommodated by transistor 110 to serve the bulk terminal of power transistor 140 is much less than the current that would be required to serve the source or drain of transistor 140.

In the embodiment of FIG. 4, note that the bulk of power transistor 140 is allowed to float when transistor 110 is turned off. In an alternative embodiment of the present invention, an additional transistor may be provided that conducts current between the output terminal 146 and the bulk of power transistor 140. The additional transistor may be configured similarly to transistor 144 so that the additional transistor senses a drop in voltage at input terminal 102 and begins to conduct current between output terminal 146 and the bulk of transistor 140. The result is that the bulk terminal of transistor 140 is pulled up to the voltage at the output terminal 146 thereby switching power transistor 140 off.

Because the amount of current conducted by transistors 110 and 120 is relatively small, the size requirement for the battery reversal protection transistors 110 and 120 protecting against battery reversal is also small. In an alternative embodiment, one could protect all the power MOS transistors of a logic circuit in the same manner. One of ordinary skill in the art will readily recognize that the concepts of the present invention can be extended to a wide variety of circuits requiring protection from battery reversal. For example, instead of protecting power MOS transistor 140, the present invention may be applied to the bulk terminal for each of a plurality of transistors included in the input circuitry of a digital circuit. Thus, applying the low current approach of the present invention, a large number of input terminals of the digital circuit may be protected using small sized transistors that utilize a reduced amount of die space.

A reverse current protect aspect of circuit 100 will now be described. Transistor 142 also conducts when the output voltage at output terminal 146 gets one threshold voltage $V_T$ level higher than the input voltage level, which may occur during battery removal. When transistor 142 conducts, then the gate of PMOS transistor 140 is pulled to the voltage at output terminal 146, which switches power MOS transistor 140 off and prevents reverse current flow from output terminal 146 to input terminal 102.

Also note that, in this embodiment, a source-bulk diode of transistor 142 connects the voltage reference 124 and error amplifier 130 to the output voltage terminal 146. As a result, current may flow from the output voltage terminal 146 to the reference circuit 124 and error amplifier 130, which may be temporarily powered by the output terminal 146. This allows the reference circuit 124 and error amplifier 130, e.g. the portion of circuit 100 that is being protected, to operate without interruption from voltage stored at output terminal 146, e.g. by various sources of capacitance, such as parasitic capacitance, present at the output terminal 146, when a momentary drop in input voltage occurs at input terminals 102 and 104.

In an alternative embodiment of the present invention, the source-bulk diode of transistor 142 that connects the voltage reference 124 and error amplifier 130 to the output voltage terminal 146 may be replaced by another PMOS transistor coupled in parallel to transistor 142, but with its drain coupled to reference circuit 124 and error amplifier 130. Thus, when the battery is removed, this additional transistor will turn on and conduct current from the output terminal 146 to the reference circuit 124 and error amplifier 130.

In view of the wide variety of embodiments to which the principles of the present invention can be applied, it should be understood that the illustrated embodiment is exemplary only, and should not be taken as limiting the scope of the present invention. For example, different types of transistors may be used other than those described, and more or fewer elements may be used than shown in the circuit diagram. By way of further example, the direction of polarity of the input voltage may be inverted and NMOS devices employed to perform circuit protection.

The claims should not be read as limited to the described elements unless stated to that effect. Therefore, all embodiments that come within the scope and spirit of the following claims and equivalents thereto are claimed as the invention.

What is claimed is:

1. A low drop-out voltage regulator circuit with battery reversal protection, the circuit comprising:

first and second input terminals for receiving a power supply voltage;

an output terminal for outputting a regulated voltage;

a voltage reference circuit having first and second supply terminals and an output terminal, where the second supply terminal of the voltage reference circuit is coupled to the second input terminal;

an error amplifier having first and second supply terminals, first and second input terminals, and an output terminal, where the second supply terminal of the error amplifier is coupled to the second input terminal, the first input terminal of the error amplifier is coupled to the output terminal of the voltage reference circuit, and the second input terminal of the error amplifier is coupled to the output terminal through a resistive divider;

a power transistor having a control terminal, a bulk terminal, and first and second current terminals, where the control terminal of the power transistor is coupled to the output terminal of the error amplifier, and the second current terminal of the power transistor is coupled to the output terminal;

a first transistor having a control terminal and first and second current terminals, where the first current terminal of the first transistor is coupled to the first input terminal and the second current terminal of the first transistor is coupled to the first supply terminal of the voltage reference circuit and the first supply terminal of the error amplifier;

a resistor coupled between the control terminal of the first transistor and the second input terminal; and a second transistor having a control terminal and first and second current terminals, where the control terminal is coupled to the first input terminal, the bulk terminal of the second transistor is coupled to the output terminal, the first current terminal of the second transistor is coupled to the output terminal, and the second current terminal of the second transistor is coupled to the control terminal of the first transistor; and a third transistor having a control terminal and first and second current terminals, the control terminal of the third transistor being coupled to the second current terminal of the second transistor, the first current terminal of the third transistor being coupled to the first input terminal, and the second current terminal of the third transistor being coupled to the bulk terminal of the power transistor.

2. The circuit of claim 1, where the first and third transistors are low current devices.

3. The circuit of claim 1, the circuit further including a fourth transistor having a control terminal, and first and second current terminals, where the control terminal of the fourth transistor is coupled to the first input terminal, the first current terminal of the fourth transistor is coupled to the output terminal, and the second current terminal of the fourth transistor is coupled to the gate terminal of the power transistor.

4. The circuit of claim 3, where the fourth transistor includes a bulk terminal, where the bulk terminal is coupled to the first supply terminal of the error amplifier.

5. The circuit of claim 1, where the first transistor is a low current device.

* * * * *